M. LUCKIESH.
FOUNTAIN.
APPLICATION FILED APR. 29, 1916.
1,280,784.
Patented Oct. 8, 1918.
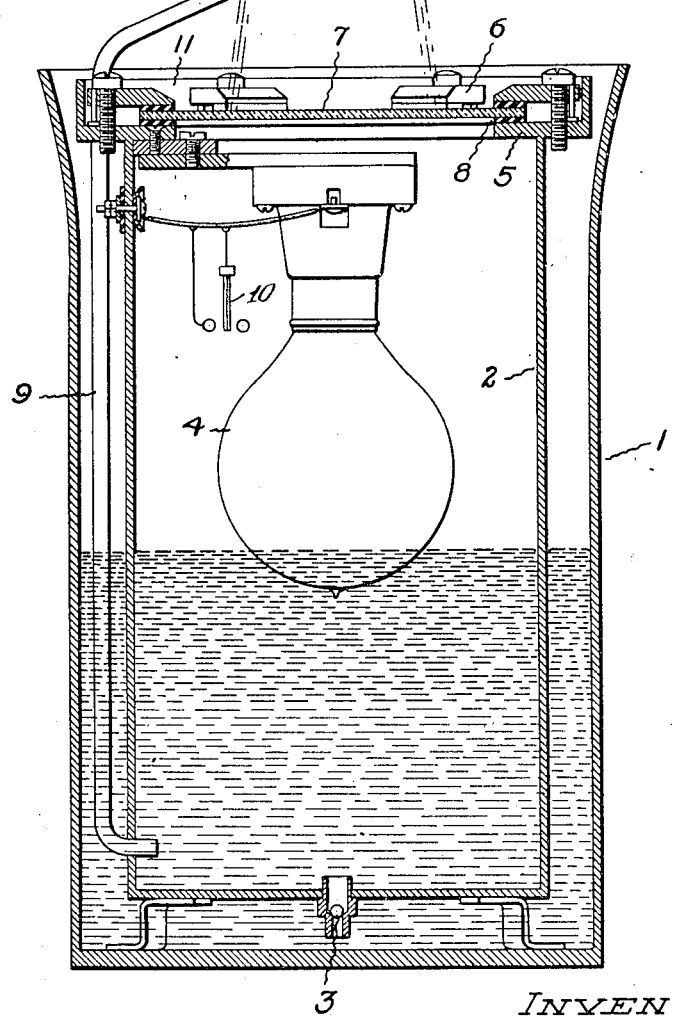
INVENTOR:
MATT LUCKIESH,
BY Albert G. Davis
HIS ATTORNEY.

UNITED STATES PATENT OFFICE.

MATT LUCKIESH, OF CLEVELAND, OHIO, ASSIGNOR TO GENERAL ELECTRIC COMPANY, A CORPORATION OF NEW YORK.

FOUNTAIN.

1,280,784.   Specification of Letters Patent.   Patented Oct. 8, 1918.

Application filed April 29, 1916. Serial No. 94,467.

*To all whom it may concern:*

Be it known that I, MATT LUCKIESH, a citizen of the United States, residing at Cleveland, county of Cuyahoga, State of Ohio, have invented certain new and useful Improvements in Fountains, of which the following is a specification.

My invention relates to thermally operated fountains and in particular to an electric fountain which may be operated by an incandescent lamp.

I have found that the heat radiated from an incandescent lamp in a confined chamber containing an expansive fluid, as air, may be sufficient to raise the temperature and pressure of the contained fluid to such a point as to be useful in elevating against atmospheric pressure a liquid contained in the chamber or liquid in communication therewith. My invention finds its particular application in small fountains, and the preferred form comprises a convenient source of heat, as an incandescent electric lamp, which is used to heat atmospheric air trapped above a liquid, as water, contained in a suitable chamber and the pressure thus created is used to force the contained liquid out through an elevated nozzle in communication therewith. Preferably, the forced out liquid or spray falls back into a second chamber and the arrangement is such that this liquid returns to the first chamber to replenish the liquid therein.

A fountain of this sort, in view of its simplicity in construction and operation, is particularly useful as a novelty for decorative purposes, although of course I am not restricted in its application.

Referring to the drawings, Figure 1 shows a part sectional and part elevational view of a preferred embodiment of my invention; and Fig. 2 shows a diagram of connections which may be used.

A cylindrical tank 1 carries therein a cylindrical tank 2, the two tanks being adapted to communicate with each other through a ball check valve 3, as indicated. The inner tank 2 contains in its upper part an incandescent electric lamp 4 which is clamped to an annular ring 5 on the top of the tank. This ring 5 coöperates with a series of clamps 6 to clamp in an air tight manner the cover 7 to the top of the tank 2, suitable gaskets 8 being disposed between the cover 7 and ring 5. A pipe 9 communicates with a liquid, as water, contained in tank 2 and leads to an elevated nozzle, as indicated.

It will be noted that the water in the inner and outer tanks is at the same level and this corresponds to the normal or cold condition, the pressure in tank 2 being equal to atmospheric pressure. Upon connecting the lamp in circuit with a suitable source of power (not shown) the heat radiated from the lamp heats up the medium, as air, above the liquid and when a sufficient increase in pressure results the contained water is forced out through the nozzle, as indicated, forming an attractive fountain. The nozzle is positioned to cause the water to fall into the outer tank 1 or on top of tank 2 where it accumulates until it overflows annular flange 11 on ring 5. The resultant submergence of cover 7 helps to maintain cover 7 cool and also to maintain the seal. The operation continues until the greater portion of the water in the inner tank is exhausted, the level of the water in the outer tank gradually rising as the level of the water in the inner tank descends. The water is replenished in the inner tank by interrupting the circuit of the lamp and permitting the air in tank 2 to cool down. As the temperature, and therefore the pressure, falls, the water gradually leaks back into tank 2 through the check valve 3 until equilibrium of pressures is again established between the two chambers when the levels will be the same as indicated in the drawing.

With the water level as indicated, it was found that an ordinary tungsten lamp of 150 to 180 watts capacity furnished sufficient heat to start the operation of the fountain almost immediately after closure of the circuit, using an inner tank 10 inches in depth and 6 inches in diameter and employing a nozzle of capillary dimensions elevated about 5 inches above the top of the tank. With the larger sizes of lamps, a thermostat 10 may be used to make and break the circuit intermittently, thereby limiting the height to which the liquid spray is forced. The thermostat may be of the ordinary type embodying a bimetallic strip which bends under heat changes and is connected in circuit with the lamp. It was found that the fountain operated with an even and steady flow even during the open circuit periods.

It should be noted that the water issuing from the nozzle during the greater part of the operation is practically at room temperature, and although the water gets slightly warm after long continued operation, there is no steam generated to issue from the nozzle.

The cover 7 is preferably of glass, either transparent, translucent or colored, for the purpose of transmitting upwardly a portion of the light from lamp 4. This light may be utilized for producing lighting effects on statuary, etc., the lighting mechanism being concealed from view. Sprays of various characteristics may be obtained by using different nozzles and also by electrification of the water.

What I claim and desire to secure by Letters Patent of the United States, is:

1. In a fountain, the combination of a receptacle containing a liquid with an expansive fluid there-above and an elevated nozzle in communication with the liquid, with means for heating the expansive fluid, said means being of such capacity as to cause the discharge of said liquid through said nozzle above the level of said receptacle.

2. In a fountain, the combination of a receptacle containing a liquid with an expansive fluid confined there-above and an elevated nozzle in communication with the liquid, with a source of heat located in the receptacle above the liquid, said heat source being of such capacity as to cause the discharge of said liquid through said nozzle above the level of the said receptacle.

3. In a fountain, the combination of a receptacle containing a liquid with an expansive fluid confined thereabove and an elevated nozzle in communication with the liquid, with an incandescent electric lamp in the receptacle above the liquid.

4. In an electric fountain, an air tight receptacle containing a liquid and an expansive fluid above the liquid, an electric incandescent lamp located in the chamber above the liquid and adapted to be energized for heating the fluid, and an elevated nozzle in communication with the liquid.

5. In an electric fountain, an air tight receptacle containing liquid with air trapped thereabove, an electric incandescent lamp located in the air space and adapted to be energized for heating the air and an elevated nozzle in communication with the liquid.

6. In an electric fountain, an outer receptacle containing liquid, an inner air tight receptacle containing trapped air and adapted to communicate with the outer receptacle through a check valve, an incandescent lamp located in the upper part of the inner receptacle and adapted to be energized to heat the entrapped air, and an elevated nozzle in communication with the liquid in the inner receptacle and positioned to cause the sprayed water to fall into the outer receptacle.

7. In an electric fountain, a receptacle containing water with air trapped thereabove, an elevated nozzle in communication with the liquid, an incandescent lamp located in the upper part of the receptacle for heating the entrapped air and a thermostat in the circuit of the lamp for intermittently opening the circuit.

8. In an electric fountain, a receptacle containing liquid with an expansive fluid trapped thereabove, an elevated nozzle in communication with the liquid, an electric heater located in the upper part of the receptacle for heating the expansive fluid and electrical means for controlling the spray.

9. In an electric fountain, a receptacle containing liquid with an expansive fluid trapped thereabove, an elevated nozzle in communication with the liquid, an electric heater located in the upper part of the receptacle for heating the expansive fluid and means operating on the circuit of the heater for controlling the height of the spray.

10. In a fountain the combination of a receptacle containing a liquid with an expansive fluid confined thereabove and an elevated nozzle in communication with the liquid, with an electric heater in the receptacle above the liquid for heating the expansive fluid, said heat source being of such capacity as to cause the discharge of said liquid through said nozzle above the level of said receptacle.

In witness whereof, I have set my hand this 26th day of April, 1916.

MATT LUCKIESH.